United States Patent
Crowe et al.

(10) Patent No.: US 10,436,343 B2
(45) Date of Patent: Oct. 8, 2019

(54) VALVE ASSEMBLY INCLUDING MAGNETIC HANDLE RETENTION WITH SPRING ASSIST

(71) Applicant: Delta Faucet Company, Indianapolis, IN (US)

(72) Inventors: Darrell S. Crowe, Lebanon, IN (US); Gerald R. Hayes, Lebanon, IN (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

(21) Appl. No.: 15/836,242

(22) Filed: Dec. 8, 2017

(65) Prior Publication Data

US 2019/0178403 A1  Jun. 13, 2019

(51) Int. Cl.
*F16K 27/02* (2006.01)
*E03C 1/04* (2006.01)
*F16K 31/60* (2006.01)

(52) U.S. Cl.
CPC ............ *F16K 27/02* (2013.01); *E03C 1/0412* (2013.01); *F16K 31/60* (2013.01); *F16K 31/605* (2013.01)

(58) Field of Classification Search
CPC ........ F16K 27/02; F16K 31/60; F16K 31/602; F16K 31/605; F16K 31/607; E03C 1/0412
See application file for complete search history.

(56) References Cited

U.S. PATENT DOCUMENTS

| | | |
|---|---|---|
| 1,654,550 A | 2/1927 | Muend |
| 2,355,736 A | 8/1944 | Klein |
| 4,186,761 A | 2/1980 | Guamieri |
| 4,515,037 A | 5/1985 | Block |
| 4,961,443 A | 10/1990 | Buccicone et al. |
| 5,082,023 A | 1/1992 | D'Alayer de Costemore d'Arc |
| 5,257,645 A | 11/1993 | Scully et al. |
| 5,551,124 A | 9/1996 | Zeringue |
| 5,947,149 A | 9/1999 | Mark |
| 6,279,604 B1 | 8/2001 | Korb et al. |
| 6,438,771 B1 | 8/2002 | Donath, Jr. et al. |
| 8,567,430 B2 | 10/2013 | Allen et al. |
| 8,881,755 B2 | 11/2014 | Thomas et al. |
| 9,062,796 B2 | 6/2015 | Horsman et al. |
| 9,481,985 B1 * | 11/2016 | Chen et al. ........... F16K 31/605 |
| 2015/0152975 A1 | 6/2015 | Jonte |

\* cited by examiner

*Primary Examiner* — Kevin L Lee
(74) *Attorney, Agent, or Firm* — Faegre Baker Daniels LLP

(57) ABSTRACT

A valve assembly for a faucet includes a valve body, a valve cartridge received within the valve body and including a valve stem defining a longitudinal axis, a handle operably coupled to the valve stem of the valve cartridge, and a magnetic coupling operably coupled between the valve body and the handle. A spring biases the magnetic coupling downwardly toward the valve body, and biases the downwardly facing surface supported by the handle downwardly toward an upwardly facing surface supported by the valve body.

27 Claims, 7 Drawing Sheets

VALVE ASSEMBLY INCLUDING MAGNETIC HANDLE RETENTION WITH SPRING ASSIST

BACKGROUND AND SUMMARY OF THE DISCLOSURE

The present invention relates to a valve assembly and, more particularly, to a valve assembly including a faucet handle assembly that provides a reduced gap interface between a handle base and a handle.

It is known to provide a faucet handle assembly including a magnetic coupling for retaining a handle on a stem of a valve cartridge. More particularly, a magnet may be rigidly attached to the handle and a magnetically attractive plate rigidly attached to the valve cartridge. The magnet mates with the magnetically attractive plate to achieve required pull forces for handle retention. To ensure the magnet and the magnetically attractive plate will consistently mate, a gap may be incorporated between the handle and the handle base to accommodate tolerances. Additionally, in order to rotationally reorient the handle relative to the valve cartridge, the magnetic force must be surpassed to disengage the handle from the valve stem.

An illustrative valve assembly of the present disclosure includes a compression spring, a clip, a washer, a stem adapter and a floating magnetically attractive plate as a retainer subassembly of a handle assembly which is rigidly attached to a valve cartridge received within a valve body. The magnetically attractive plate is allowed to move axially in order to couple with the magnet, which helps compensate for component tolerances. The force of the spring resists upward movement of the magnetically attractive plate. The spring force is less than the magnetic force of the magnet and, as such, the magnetic force pulls the magnetically attractive plate into contact with the magnet. Once the magnetically attractive plate has been pulled into contact with the magnet, the spring force is translated to pulling the handle down towards the valve cartridge resulting in a reduced gap between the handle and a handle base. The handle base may be defined by an escutcheon or trim flange supported by the valve body. A friction washer or ring may be positioned intermediate the handle and the flange. A reduced gap between the handle, the friction washer, and the flange helps to improve the overall aesthetics/appearance of the design, adds stability to the handle which helps to improve consumer perception, and helps prevent undesired water from entering the handle assembly.

According to an illustrative embodiment of the present disclosure, a valve assembly for a faucet includes a valve body, a valve cartridge received within the valve body and having a valve stem defining a longitudinal axis, and a handle operably coupled to the valve stem of the valve cartridge. The valve assembly further includes a magnetic coupling including a first coupling member supported by the valve stem and a second coupling member supported by the handle, wherein the first coupling member is magnetically coupled to the second coupling member, and the magnetic coupling is moveable along the longitudinal axis of the valve stem.

According to another illustrative embodiment of the present disclosure, a handle assembly for operating a valve cartridge received within a valve body of a faucet includes a fixed member supporting an upwardly facing surface, and a moveable member operably coupled to the valve cartridge and supporting a downwardly facing surface. The handle assembly further includes a valve stem extending between the valve cartridge and the moveable member, a spring receiving the stem, an upper retainer coupled to the stem, and a lower retainer coupled to the stem positioned below the upper retainer, the spring being received intermediate the upper retainer and the lower retainer. The handle assembly further includes a magnetic coupling including a first coupling member supported by the valve stem and a second coupling member supported by the handle. The first coupling member is magnetically coupled to the second coupling member, the magnetic coupling is moveable along the longitudinal axis of the valve stem, and the lower retainer is supported by the first coupling member.

According to a further illustrative embodiment of the present disclosure, a valve assembly for a faucet includes a valve body, a valve cartridge received within the valve body and including a valve stem, and a handle operably coupled to the valve stem of the valve cartridge. The valve assembly further includes a magnetic coupling operably coupled between the valve body and the handle, and a spring operably coupled between the magnetic coupling and the valve stem. The spring biases the magnetic coupling downwardly toward the valve body, and biases the downwardly facing surface toward the upwardly facing surface.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
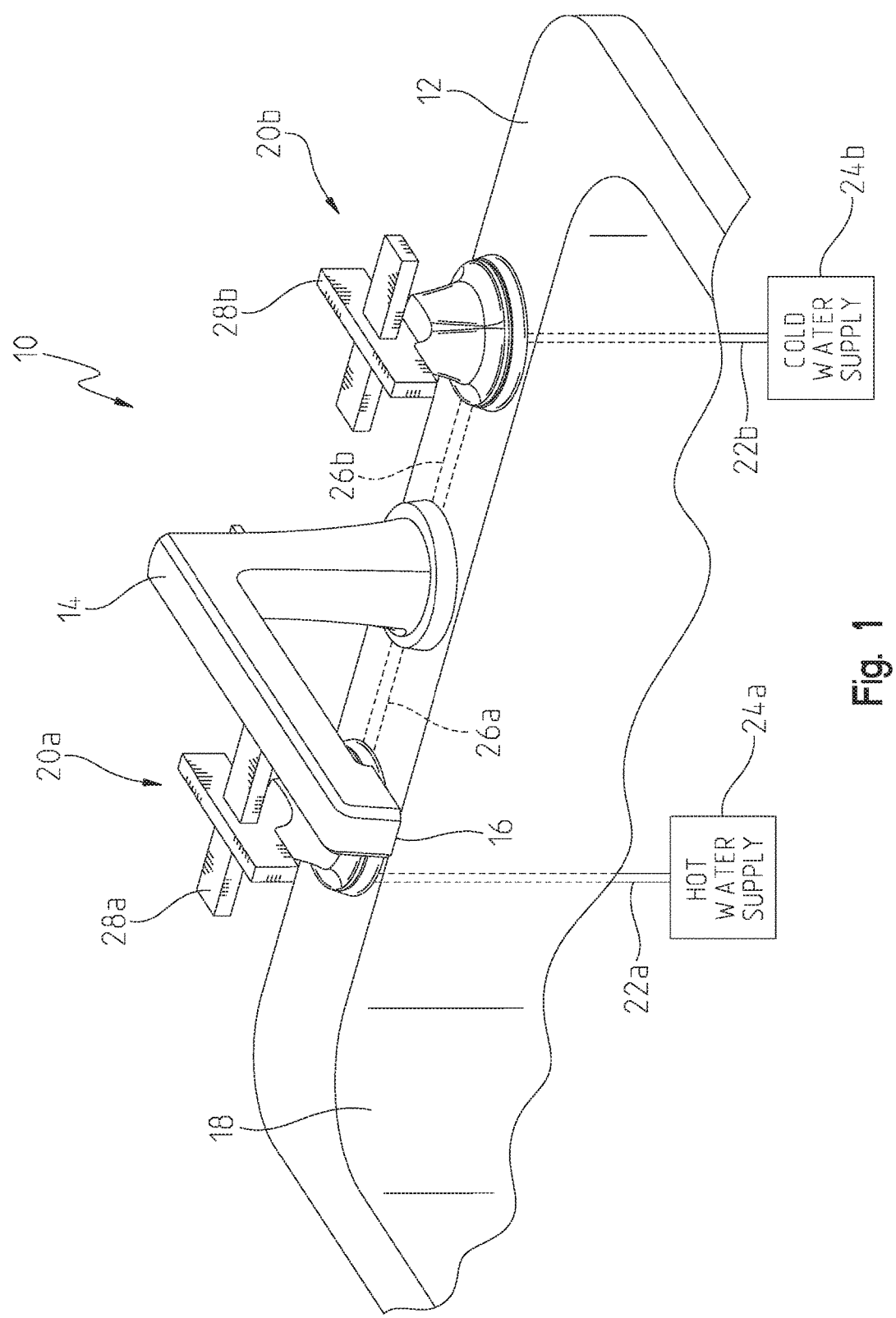
FIG. 1 is a perspective view of an illustrative faucet of the present disclosure coupled to a mounting deck.

Referring initially to FIG. 1, an illustrative faucet 10 is shown coupled to a mounting deck 12, such as a sink deck, and illustratively includes a delivery spout 14 having a water outlet 16 for dispensing water into a sink basin 18. Hot and cold water valve assemblies 20a and 20b are fluidly coupled to the delivery spout 14 and are configured to control water flow to the outlet 16. More particularly, a hot water supply conduit 22a supplies hot water from a hot water supply 24a to the hot water valve assembly 20a, and a cold water supply conduit 22b supplies cold water from a cold water supply 24b to the cold water valve assembly 20b. Hot and cold water outlet conduits 26a and 26b fluidly couple the valve assemblies 20a and 20b to the delivery spout 14. Operation of user interfaces or handles 28a and 28b of the respective valve assemblies 20a and 20b controls water flow from the conduits 22a and 22b to the outlet conduits 26a and 26b and the outlet 16. More particularly, the valve assemblies 20a and 20b control the flow rate and the temperature (i.e., mixture of water from the hot and cold water conduits 22a and 22b) of water dispensed from the water outlet 16.

Figure 2:
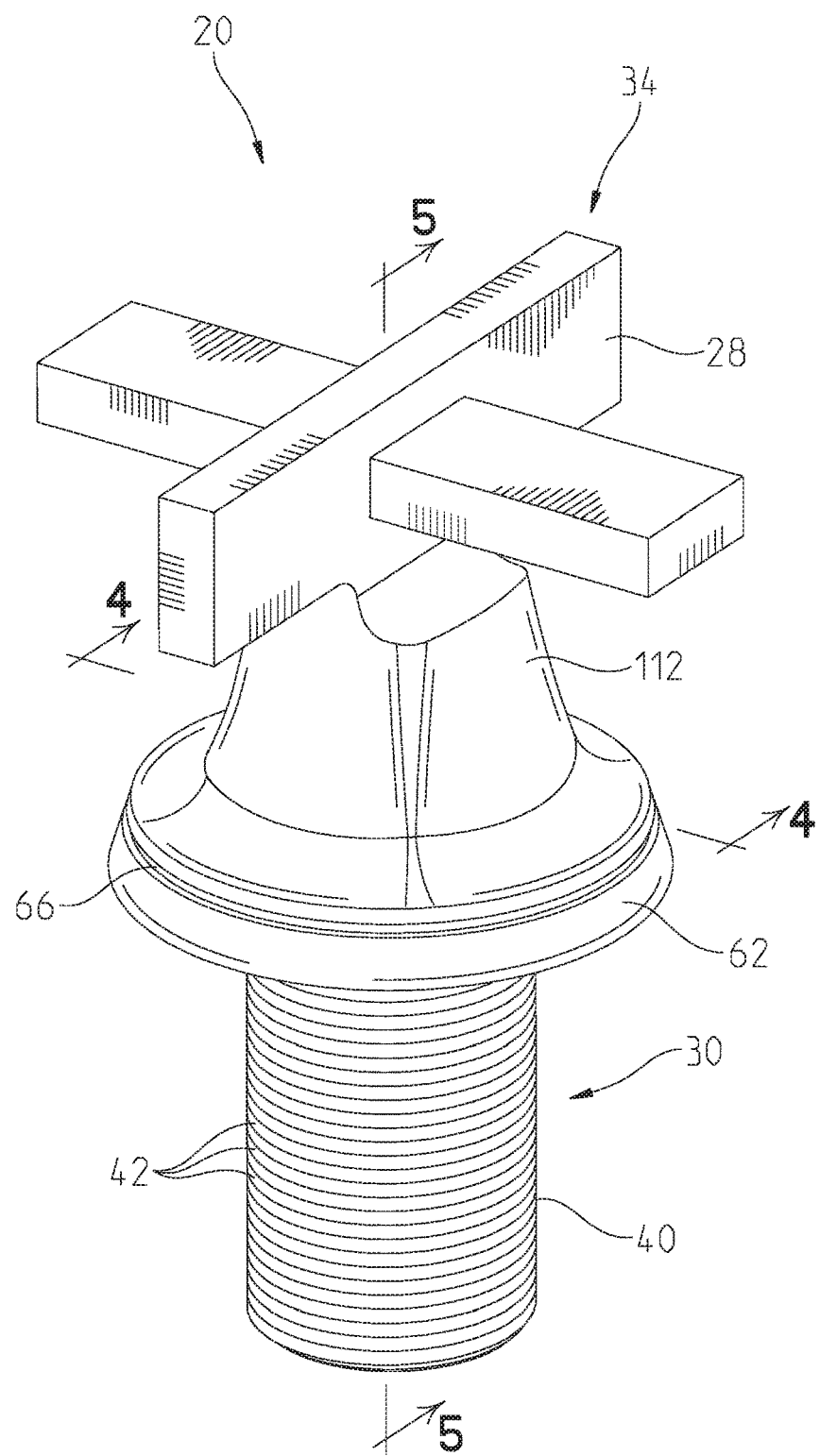
FIG. 2 is a perspective view of an illustrative valve assembly of the faucet of FIG. 1.
Figure 3:
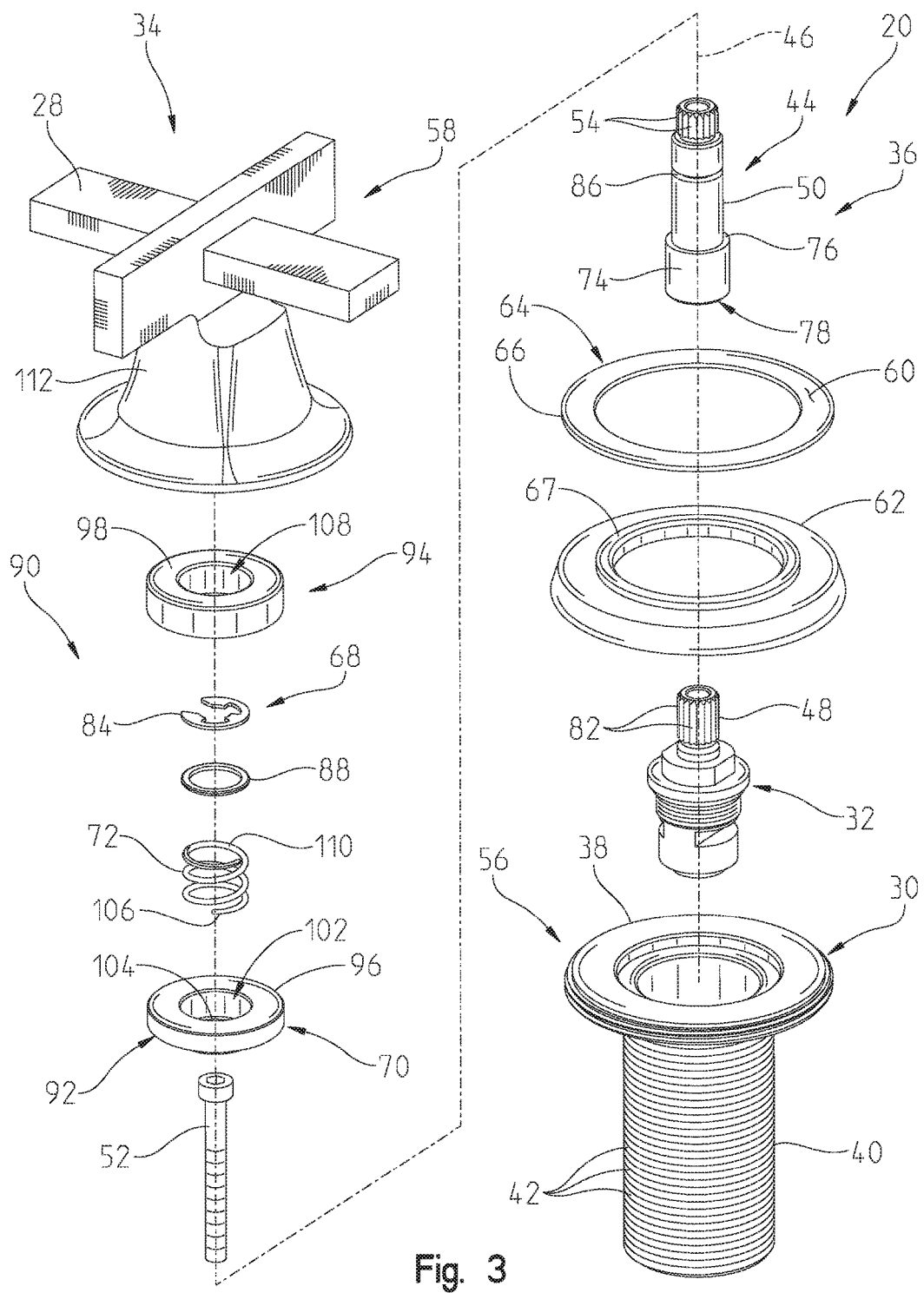
FIG. 3 is an exploded perspective view of the valve assembly of FIG. 2.

With reference to FIGS. 2 and 3, the valve assemblies 20a and 20b are substantially identical, with the exception of the direction of rotation (clockwise vs. counterclockwise) of the handles 28a and 28b and associated internal flow control members (not shown). Each illustrative valve assembly 20 includes a valve body 30 receiving a valve cartridge 32. A handle assembly 34 is operably coupled to the valve cartridge 32 and includes a retainer subassembly 36 configured to couple the handle 28 to the valve cartridge 32.

The valve body 30 is configured to be supported within an opening in the sink deck 12 and illustratively includes an upper flange 38 and a downwardly extending tubular mounting shank 40. The mounting shank 40 includes a plurality of external threads 42 configured to cooperate with a mounting nut (not shown) for securing the valve body 30 to the sink deck 12.

The valve cartridge 32 illustratively includes a valve stem 44 defining a longitudinal axis 46. The valve stem 44 illustratively includes a cartridge stem 48 and a stem adapter 50 extending upwardly from the valve cartridge 32. A fastener, such as a bolt or machine screw 52, couples the cartridge stem 48 with the stem adapter 50 in coaxial alignment. An upper end of the stem adapter 50 includes a plurality of longitudinally extending external splines 54. The retainer subassembly 36 is configured to secure the handle 28 to the valve stem 44.

The handle 28 is operably coupled to the valve stem 44 which, in turn, is operably coupled to internal flow control members (not shown), such as a rotatable fluid flow plate fluidly coupled to a fixed fluid flow plate. The valve cartridge 32 may be similar to that detailed in U.S. Pat. No. 8,881,755 to Thomas et al., the disclosure of which is expressly incorporated herein by reference.

With reference to FIGS. 2-5, the illustrative faucet handle assembly 34 includes a fixed member 56 defined by the valve body 30, and a moveable member 58 defined by the handle 28 and operably coupled to the valve cartridge 32 via the valve stem 44. The fixed member 56 as defined by the valve body 30 includes an upwardly facing surface 60. An escutcheon or trim flange 62 is operably coupled to the upper flange 38 of the valve body 30. A handle base 64 is illustratively defined by the valve body 30 and the escutcheon 62. A friction washer or ring 66 is illustratively positioned above the escutcheon 62, outside of an annular shoulder 67, and illustratively defines the upwardly facing surface 60.

The retainer subassembly 36 is configured to retain the handle 28 to the valve cartridge 32 received within the valve body 30. The retainer subassembly 36 illustratively includes the stem adapter 50, an upper retainer 68 coupled to the stem adapter 50, a lower retainer 70 coupled to the stem adapter 50 and positioned below the upper retainer 68. A spring 72 receives the stem adapter 50 and extends between the upper retainer 68 and the lower retainer 70.

The stem adapter 50 illustratively includes an enlarged lower portion 74 defining a step 76, and an opening 78 to receive the cartridge stem 48. The opening 78 of the stem adapter 50 illustratively includes a plurality of longitudinally extending internal splines 80 configured to engage with a plurality of longitudinally extending external splines 82 of the cartridge stem 48. The upper retainer 68 illustratively includes a retention clip 84 received within an annular groove 86 of the stem adapter 50, and a backup washer 88 positioned below the retention clip 84 and received around an outer surface of the stem adapter 50.

The retainer subassembly 36 further includes a magnetic coupling 90. The magnetic coupling 90 illustratively includes a first member 92 supported by the stem adapter 50, and a second member 94 supported by the handle 28. The first member 92 illustratively comprises a magnetically attractive member, such as a magnetically attractive plate or washer 96. The second member 94 illustratively comprises a magnet 98 fixed to the handle 28.

The magnetic coupling 90 is illustratively moveable along the longitudinal axis 46 of the valve stem 44. The magnetic coupling 90 is configured to provide an axial coupling force between the first member 92 and the second member 94 of at least 10 pounds. While the first member 92 illustratively comprises a magnetically attractive member, and the second member 94 illustratively comprises a magnet, it should be appreciated that in other illustrative embodiments the magnetic coupling 90 may be defined by various combinations of magnets and/or magnetically attractive members. For example, the first member 92 may comprise a magnet and the second member 94 may comprise a magnetically attractive member, or the first member 92 may comprise a magnet and the second member 94 may also comprise a magnet.

The spring 72 is operably coupled between the magnetic coupling 90 and the valve stem 44. The spring 72 illustratively comprises a compression spring receiving the stem adapter 50 and extending between the upper retainer 68 and the lower retainer 70.

Illustratively, the lower retainer 70 is integral with the first member 92. More particularly, the lower retainer 70 may be defined by a pocket 102 including a lower wall or annular lip 104 of the magnetically attractive plate 96. More particularly, a lower end 106 of the spring 72 is received within the pocket 102 of the lower retainer 70 and engages the annular lip 104. The magnet 98 illustratively includes a center opening 108 receiving an upper end 110 of the spring 72.

The handle 28 illustratively includes a body 112 having a downward opening or receiving bore 114 with a plurality of longitudinally extending internal splines 116. The external splines 54 of the stem adapter 50 are configured to cooperate with the splines 116 of the handle 28. The magnet 98 is received within the bore 114, while an upper portion of the retainer assembly 36 (including the stem adapter 50, the upper retainer 68, and the spring 72) is concentrically received with the center opening 108. A downwardly facing surface 118 illustratively surrounds the bore 114.

Figure 4:
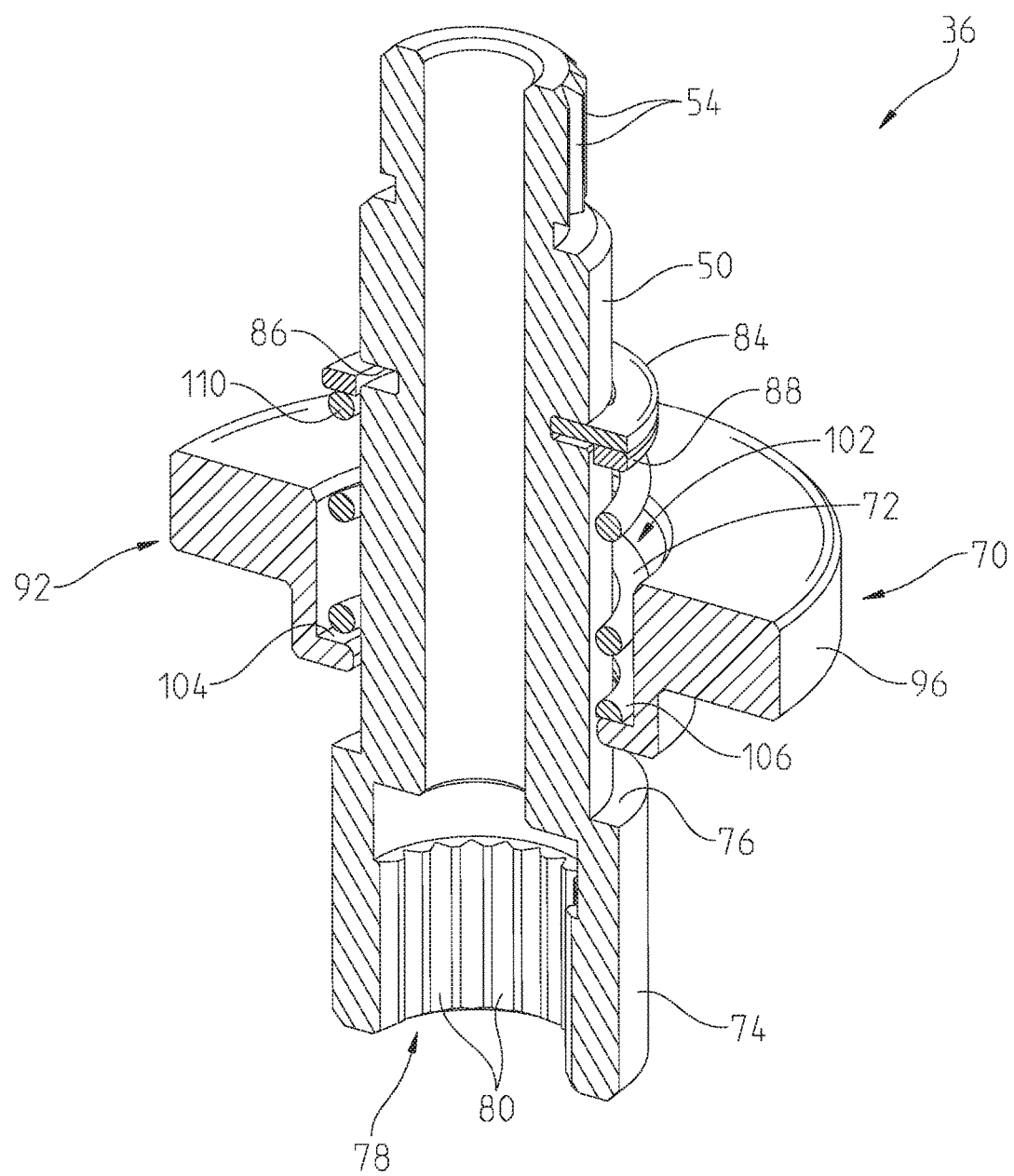
FIG. 4 is a cross-sectional view of a retainer subassembly of the valve assembly taken along line 4-4 of FIG. 2.
Figure 5:
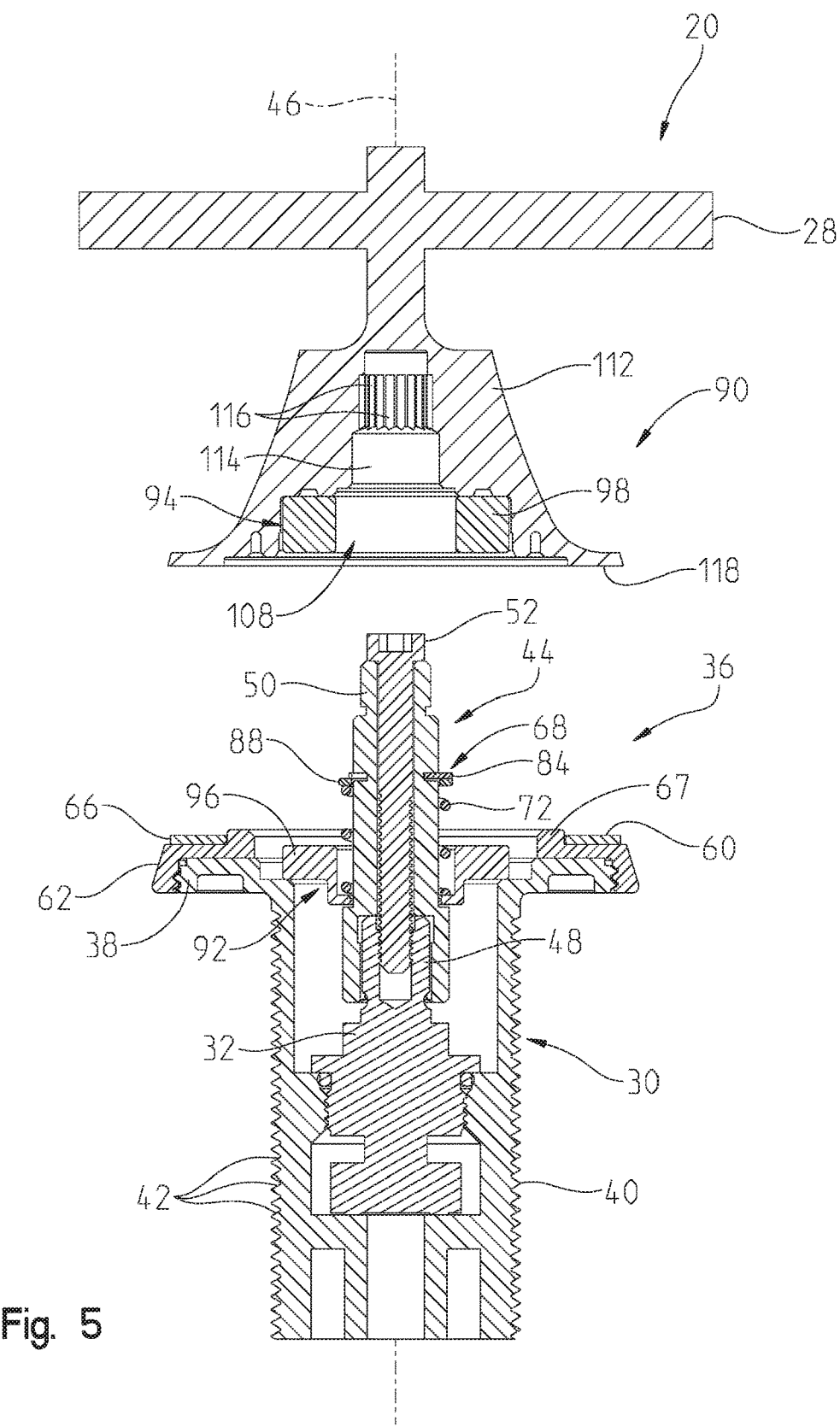
FIG. 5 is a cross-sectional view of the valve assembly taken along line 5-5 of FIG. 2, showing the handle removed from the valve stem.
Figure 6:
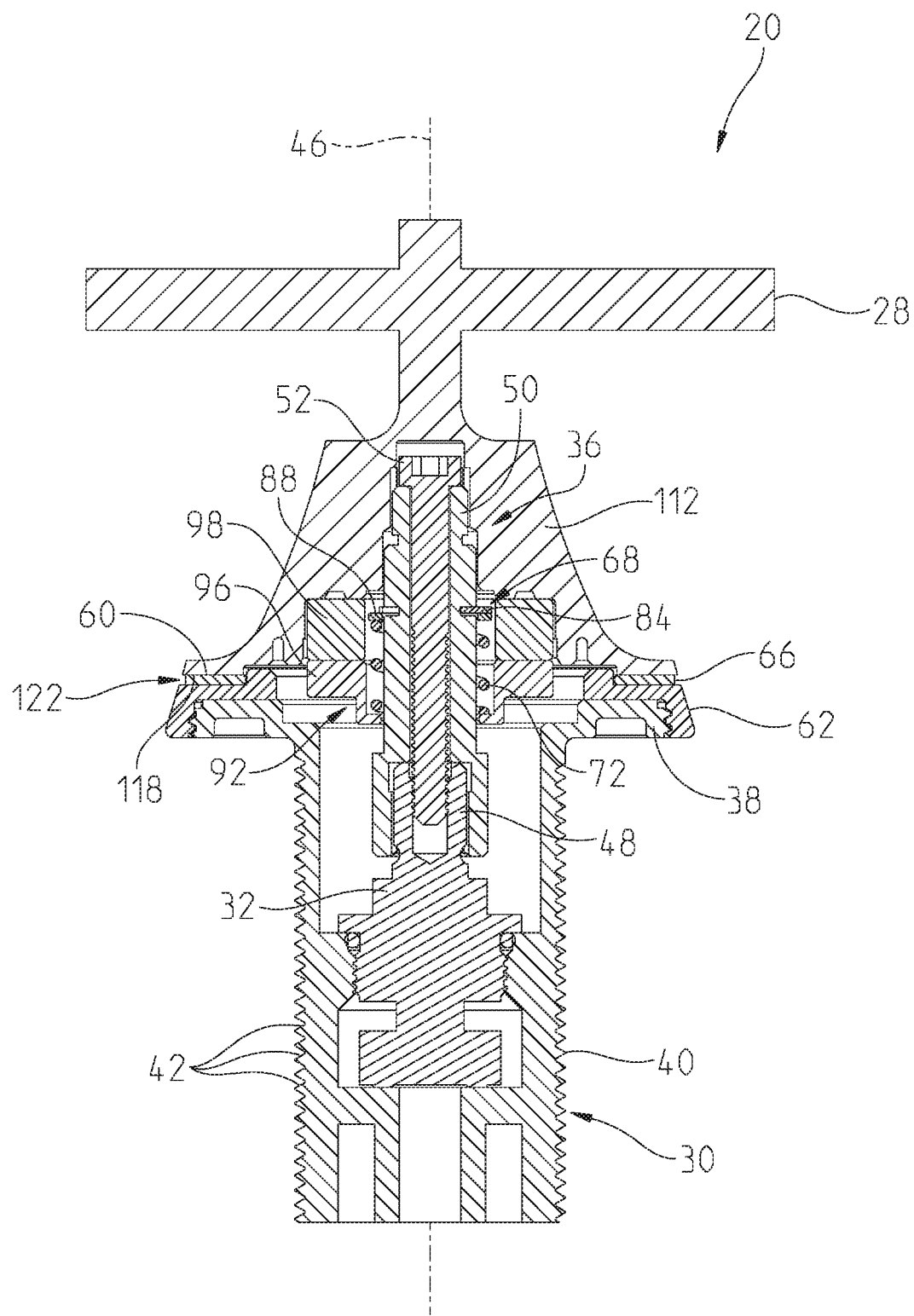
FIG. 6 is a cross-sectional view of the valve assembly similar to FIG. 5, showing the handle coupled to the valve body in a normal mode of operation.

With reference to FIGS. 4-6, the spring 72 biases the magnetic coupling 90 downwardly toward the valve body 30, and biases the downwardly facing surface 118 toward the upwardly facing surface 60. The friction washer or ring 66 is illustratively positioned within a gap 122 defined between the upwardly facing surface 60 and the downwardly facing surface 118.

With reference to FIG. 4, components of the retainer subassembly 36 are illustratively assembled in the following manner. Initially, the magnetically attractive plate 96 is assembled axially onto the stem adapter 50 and stops on the step 76 of the stem adapter 50. Next, the compression spring 72 is assembled onto the stem adapter 50 and rests on the magnetically attractive plate 96. The backup washer 86 is then assembled onto the stem adapter 50 and sits on top of the spring 72. Next, the backup washer 86 is forced down to slightly compress the spring 72 and allow the retention clip 84 to engage with the groove 88 near the top of the stem adapter 50 to complete the subassembly 36. Once assembled, the magnetically attractive plate 96 will only move upwards on the stem adapter 50, which will compress the spring 72. The magnetically attractive plate 96 will move until the spring 72 reaches solid height.

As shown in FIG. 5, the valve cartridge 32 is illustratively received within the valve body 30 with the upper flange 38 supported on an upper surface of the sink deck 12, and the mounting shank 40 extending through opening in the sink deck 12. The escutcheon 62 is located on top of the upper flange 38, and the friction washer 66 is then located on the top of the upper flange 38.

The subassembly 36 is vertically fixed to the valve cartridge 32 using machine screw 52 through the center of the stem adapter 50. The external splines 54 at the upper end of the stem adapter 50 mate with the internal splines 116 of the handle 28, and the internal splines 80 at the lower end of the stem adapter 50 mate with the valve cartridge 32 in order to fix the rotational degree of freedom between the handle 28 and the valve cartridge 32.

The handle 28 with internal splines 116 and fixed magnet 98 is illustratively assembled by lowering onto the external splines 54 of the stem adapter 50. As the handle 28 is lowered onto the stem adapter 50 and the bottom of the handle 28 nears the friction washer 66, the magnetic attraction between the magnet 98 and the magnetically attractive plate 96 will overcome the spring force of the compression spring 72 and the magnet 98 will pull the magnetically attractive plate 96, compressing the spring 72, until the magnet 98 and the magnetically attractive plate 96 have surface to surface contact.

Because the spring 72 is compressed, the compression force is translated to a downward force between the handle 28 and the friction washer 66, resulting in a reduced (illustratively, a zero) gap between the downwardly facing surface 118 of the handle 28 and the upwardly facing surface 60 of the friction washer 66, and a relatively consistent force. The selective pairing of magnet force and maximum spring force, result in maintaining the required minimum separation force of 10 lbs.

In a normal mode of operation shown in FIG. 6, the external splines 54 at the upper end of the stem adapter 50 engage with the internal splines 116 of the handle 28 such that the valve stem 44 is rotatably coupled with the handle 28. In this mode, the spring 72 has a certain amount of compression travel still available prior to reaching solid height. Pulling up on the handle 28 will be resisted by the spring force until solid height is reached at which time any additional upward force will be translated to separating the magnet 98 and magnetically attractive plate 96. The amount of travel prior to reaching solid height allows the internal splines 116 of the handle 28 to clear the external splines 54 of the stem adapter 50.

Figure 7:
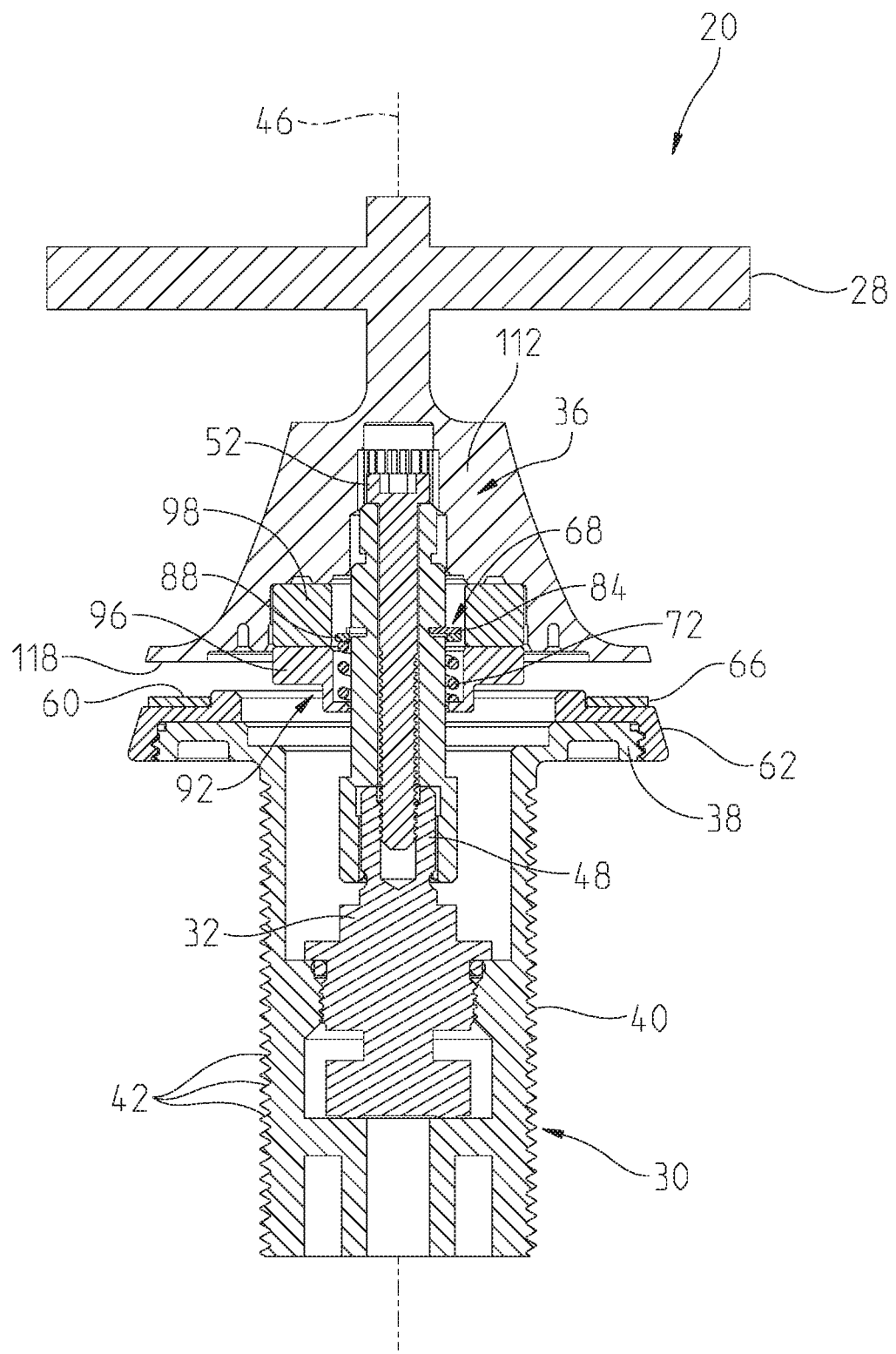
FIG. 7 is a cross-sectional view of the valve assembly similar to FIG. 6, showing the handle in an adjustment mode of operation, where the handle is moved upwardly such that cooperating splines of the valve stem and the handle are disengaged.

In this adjustment mode of operation shown in FIG. 7, the external splines 54 at the upper end of the stem adapter 50 are disengaged from the internal splines 116 of the handle 28 such that the valve stem 44 is rotatably uncoupled from the handle 28. Relative rotation between the handle 28 and the valve cartridge 32 is allowed for handle reorientation purposes, without complete uncoupling or separation between the handle 28 and valve cartridge 32. The amount of travel of spring compression versus the amount of spline engagement allows the handle 28 to be pulled upwards against a lesser spring force to disengage the splines 116, 54 and reorient the handle 28 relative to the valve cartridge 32 without imparting the entire greater separation force between the magnet 98 and the magnetically attractive plate 96.

In the normal mode of operation, the splines 116, 54 of the handle 28 and the stem adapter 50 are engaged such that rotation of the handle 28 also rotates the valve stem 44 for operating the valve cartridge 32 (FIG. 6). The valve assembly 20 of the present disclosure provides for a reduced or substantial zero gap between the handle 28 and the handle base 64. Additionally, in the adjustment mode of operation, the valve assembly 20 allows for reorientation of the handle 28 relative to the valve cartridge 32 without fully separating the handle 28 from the valve assembly 20 (FIG. 7).

Although the invention has been described in detail with reference to certain preferred embodiments, variations and modifications exist within the spirit and scope of the invention as described and defined in the following claims.

The invention claimed is:

1. A valve assembly for a faucet, the valve assembly comprising:
   a valve body;
   a valve cartridge received within the valve body and including a valve stem defining a longitudinal axis;
   a handle operably coupled to the valve stem of the valve cartridge; and
   a magnetic coupling including a first coupling member supported by the valve stem and a second coupling member supported by the handle, the first coupling member magnetically coupled to the second coupling member, the magnetic coupling being movable along the longitudinal axis of the valve stem as the first coupling member remains magnetically coupled to the second coupling member.

2. The valve assembly of claim 1, further comprising:
   an upwardly facing surface supported by the valve body;
   a downwardly facing surface supported by the handle; and
   a spring operably coupled between the magnetic coupling and the valve stem, the spring biasing the magnetic coupling downwardly toward the valve body, and biasing the downwardly facing surface toward the upwardly facing surface.

3. The valve assembly of claim 2, further comprising a friction washer positioned within a gap defined between the upwardly facing surface and the downwardly facing surface.

4. The valve assembly of claim 2, further comprising:
   a retainer coupled to the valve stem;
   wherein the spring receives the valve stem and is supported between the first coupling member of the magnetic coupling and the retainer;
   wherein the first coupling member of the magnetic coupling comprises a magnetically attractive member; and
   wherein the second coupling member of the magnetic coupling comprises a magnet.

5. The valve assembly of claim 2, further comprising:
   an escutcheon operably coupled to an upper end of the valve body and defining the upwardly facing surface; and
   wherein a lower surface of the handle defines the downwardly facing surface.

6. The valve assembly of claim 1, wherein the magnetic coupling provides an axial coupling force of at least 10 pounds.

7. The valve assembly of claim 1, wherein:
the handle includes a receiving bore having a plurality of splines; and
the valve stem includes an upper end having a plurality of splines configured to cooperate with the plurality of splines of the handle.

8. The valve assembly of claim 7, wherein when in a normal mode of operation, the splines of the handle engage the splines of the valve stem such that the handle is rotatably coupled with the valve stem, and in an adjustment mode of operation, the splines of the handle are disengaged from the splines of the valve stem such that the handle is rotatably uncoupled from the valve stem.

9. The valve assembly of claim 1, wherein the valve stem is received within a spring, the first coupling member includes a pocket receiving a lower end of the spring, and the second coupling member includes a center opening receiving an upper end of the spring.

10. A valve assembly for a faucet, the valve assembly comprising:
a valve body;
a valve cartridge received within the valve body and including a valve stem defining a longitudinal axis;
a handle operably coupled to the valve stem of the valve cartridge;
a magnetic coupling including a first coupling member supported by the valve stem and a second coupling member supported by the handle, the first coupling member magnetically coupled to the second coupling member, the magnetic coupling being movable along the longitudinal axis of the valve stem;
the handle including a receiving bore having a plurality of splines;
the valve stem including an upper end having a plurality of splines configured to cooperate with the plurality of splines of the handle; and
wherein the valve stem includes a cartridge stem and a stem adapter operably coupled to the cartridge stem.

11. A handle assembly for operating a valve cartridge received within a valve body of a faucet, the handle assembly comprising:
a fixed member supporting an upwardly facing surface;
a movable member operably coupled to the valve cartridge and supporting a downwardly facing surface;
a valve stem extending between the valve cartridge and the movable member;
a spring receiving the valve stem;
an upper retainer coupled to the valve stem;
a lower retainer coupled to the valve stem and positioned below the upper retainer, the spring received intermediate the upper retainer and the lower retainer; and
a magnetic coupling including a first coupling member supported by the valve stem and a second coupling member supported by the handle, the first coupling member magnetically coupled to the second coupling member, the magnetic coupling movable along the longitudinal axis of the valve stem, the lower retainer being supported by the first coupling member.

12. The handle assembly of claim 11, wherein the first coupling member of the magnetic coupling comprises a magnetically attractive member, and the second coupling member of the magnetic coupling comprises a magnet.

13. The handle assembly of claim 11, wherein the magnetic coupling provides an axial coupling force of at least 10 pounds.

14. The handle assembly of claim 11, wherein:
the movable member includes a handle having a receiving bore with a plurality of splines; and
the stem includes an upper end having a plurality of splines configured to cooperate with the plurality of splines of the handle.

15. The handle assembly of claim 14, wherein when in a normal mode of operation, the splines of the handle engage the splines of the stem such that the handle is rotatably coupled with the stem, and in an adjustment mode of operation, the splines of the handle are disengaged from the splines of the stem such that the handle is rotatably uncoupled from the stem.

16. The handle assembly of claim 11, wherein the lower retainer is integral with the first coupling member.

17. The handle assembly of claim 11, wherein the fixed member is defined by a valve body, and the movable member is defined by a handle, and the spring is operably coupled between the magnetic coupling and the valve stem, the spring biasing the magnetic coupling downwardly toward the valve body, and biasing the downwardly facing surface toward the upwardly facing surface.

18. The handle assembly of claim 17, further comprising a friction washer positioned within a gap defined between the upwardly facing surface and the downwardly facing surface.

19. A valve assembly for a faucet, the valve assembly comprising:
a valve body;
an upwardly facing surface supported by the valve body;
a valve cartridge received within the valve body and including a valve stem;
a handle operably coupled to the valve stem of the valve cartridge;
a downwardly facing surface supported by the handle;
a magnetic coupling operably coupled between the valve body and the handle; and
a spring operably coupled between the magnetic coupling and the valve stem, the spring biasing the magnetic coupling downwardly toward the valve body, and biasing the downwardly facing surface toward the upwardly facing surface.

20. The valve assembly of claim 19, wherein the magnetic coupling includes a first coupling member supported by the valve stem, and a second coupling member supported by the handle, the first coupling member being magnetically coupled to the second coupling member, the magnetic coupling being movable along a longitudinal axis of the valve stem.

21. The valve assembly of claim 20, further comprising:
a retainer coupled to the valve stem;
wherein the spring receives the valve stem and is supported between the first coupling member of the magnetic coupling and the retainer;
wherein the first coupling member of the magnetic coupling comprises a magnetically attractive member; and
wherein the second coupling member of the magnetic coupling comprises a magnet.

22. The valve assembly of claim 20, wherein the valve stem is received within the spring, the first coupling member includes a pocket receiving a lower end of the spring, and the second coupling member includes a center opening receiving an upper end of the spring.

23. The valve assembly of claim 19, further comprising a friction washer positioned within a gap defined between the upwardly facing surface and the downwardly facing surface.

24. The valve assembly of claim 23, further comprising:
an escutcheon operably coupled to an upper end of the valve body and defining the upwardly facing surface; and
wherein a lower surface of the handle defines the downwardly facing surface.

25. The valve assembly of claim 19, wherein the magnetic coupling provides an axial coupling force of at least 10 pounds.

26. The valve assembly of claim 19, wherein:
the handle includes a receiving bore having a plurality of splines; and
the valve stem includes an upper end having a plurality of splines configured to cooperate with the plurality of splines of the handle;
wherein when in a normal mode of operation, the splines of the handle engage the splines of the valve stem such that the handle is rotatably coupled with the valve stem, and in an adjustment mode of operation, the splines of the handle are disengaged from the splines of the valve stem such that the handle is rotatably uncoupled from the valve stem.

27. The valve assembly of claim 26, wherein the valve stem includes a cartridge stem and a stem adapter operably coupled to the cartridge stem.

* * * * *